United States Patent

Pai et al.

(10) Patent No.: US 10,725,596 B2
(45) Date of Patent: Jul. 28, 2020

(54) COMPOSITE TRANSPARENT TOUCH SENSOR

(71) Applicants: Chih-Chiang Pai, Taoyuan (TW); Meng-Guei Lin, Taoyuan (TW); Chin-Fong Lin, Taoyuan (TW); Chiu-Wen Chen, Taoyuan (TW)

(72) Inventors: Chih-Chiang Pai, Taoyuan (TW); Meng-Guei Lin, Taoyuan (TW); Chin-Fong Lin, Taoyuan (TW); Chiu-Wen Chen, Taoyuan (TW)

(73) Assignee: YOUNG FAST OPTOELECTRONICS CO., LTD., Taoyuan (TW)

( * ) Notice: Subject to any disclaimer, the term of this patent is extended or adjusted under 35 U.S.C. 154(b) by 0 days.

(21) Appl. No.: 15/993,664

(22) Filed: May 31, 2018

(65) Prior Publication Data

US 2019/0369764 A1 Dec. 5, 2019

(51) Int. Cl.
*G06F 3/044* (2006.01)
*G06F 3/047* (2006.01)

(52) U.S. Cl.
CPC .............. *G06F 3/044* (2013.01); *G06F 3/047* (2013.01); *G06F 2203/04103* (2013.01)

(58) Field of Classification Search
CPC ....................................................... G06F 3/044
See application file for complete search history.

(56) References Cited

U.S. PATENT DOCUMENTS

| | | | | |
|---|---|---|---|---|
| 2013/0215074 A1* | 8/2013 | Lin | .......................... | G06F 3/044 345/174 |
| 2016/0139701 A1* | 5/2016 | Wang | ...................... | G06F 3/046 345/174 |
| 2016/0179266 A1* | 6/2016 | Yang | ....................... | G06F 3/044 345/174 |
| 2017/0277289 A1* | 9/2017 | Ogura | ..................... | G06F 3/041 |

* cited by examiner

*Primary Examiner* — Kent W Chang
*Assistant Examiner* — Scott Au

(57) ABSTRACT

A capacitive touch sensor includes two sensing layers. Each sensing layer has capacitive sensing strings and electromagnetic antenna strings. Each of the capacitive sensing strings and electromagnetic antenna strings is connected to a highly conductive element. A transparent insulative layer is arranged between the two sensing layers. The two groups of sensing strings on two the capacitive sensing layers orthogonally interlace with each other to form a capacitive sensing matrix.

13 Claims, 8 Drawing Sheets

COMPOSITE TRANSPARENT TOUCH SENSOR

BACKGROUND OF THE INVENTION

1. Technical Field

The invention relates to touch sensors, particularly to an integrated structure of both capacitive and electromagnetic touch sensor.

2. Related Art

Most of currently available touch sensors adopt indium tin oxide (ITO) to serve as a material because it possesses transparency which allows to be mounted on a display. On the other hand, an X/Y-axes antenna array of conventional electromagnetic touch sensors uses a metal material. Metal wires do not have transmittance, so they are usually attached under a display to prevent from reducing visibility of the display.

In detail, conventional transparent touch sensors are made of transparent indium tin oxide (ITO) films, on which touch sensing electrodes and their signal paths are formed. However, recent electronic products tend toward compactness and precision, so touch sensing electrodes and signal paths become tinier and tinier in size. Narrowed ITO sensing electrodes and signal paths will increase impedance to attenuate signals. It is adverse to signal transmission. Accordingly, a serious problem to large-sized touch panels is hard to be overcome.

On the other hand, an induction coil circuit or antenna array of an electromagnetic touch sensor must have low impedance, general transparent ITO films cannot satisfy such a requirement, so all current electromagnetic touch sensors adopt a metal material to make their induction coil circuits or antenna arrays. Of course, they can only be attached under a display. This causes increase of overall thickness of a screen panel and is adverse to thinning. Further, when an electromagnetic pen is being used over an electromagnetic touch sensor under a display, it is easy to cause electromagnetic interference. Although some manufacturers attempt to miniaturize the metal wires forming an induction coil circuit or antenna array to increase transmittance to be able to be mounted on a display. However, to keep an effect of electromagnetic induction and to prevent the wires from being broken, width of the wires cannot be too narrow. For example, the narrowest width of a currently available wire which is made of molybdenum-aluminum-molybdenum is about 0.04 mm. However, when such a 0.04 mm-widthed metal wire is used to make an induction coil circuit or antenna array, not only is the wire easy to be broken or form bad connection, but also such an opaque metal wire also form a shading effect to reduce the visibility of an image shown on the display. Also, this opaque metal wire is usually a straight line, it tends to cause regular superposition with a TFT array. This may cause a moire pattern to affect image quality.

SUMMARY OF THE INVENTION

An object of the invention is to provide a transparent touch sensor structure with both a capacitive touch sensor and an electromagnetic touch sensor, which simultaneously offers two touch input manners to make users convenient to operate. The multiple touch input function is advantageous to development and application of new apps. Besides, two kinds of touch sensors being integrated into a touch sensor structure can not only save cost but also effectively thin thickness of the touch sensor structure.

Another object of the invention is to provide a composite transparent touch sensor structure with low impedance, which is provided with nanoscale wires with high conductivity to effectively reduce impedance of an induction coil circuit or antenna array. This can increase sensitivity of touch operation and transmission efficiency of touch signals under a condition of keeping transmittance. Also, this is advantageous to design of large-sized touch panels.

To accomplish the above objects, the invention provides a composite transparent capacitive touch sensor, which includes:

a transparent first sensing layer, having first capacitive sensing strings and first electromagnetic antenna strings, each first capacitive sensing string being composed of first capacitive sensing units connected in series along a first direction, an end of each first capacitive sensing string being provided with a first capacitive signal contact, each first electromagnetic antenna string being arranged along the first direction, an end of each first electromagnetic antenna string being provided with a first electromagnetic signal contact, another end thereof being connected to a first in-series wire, the first in-series wire connecting first electromagnetic antenna strings in series, each first capacitive sensing string and each first electromagnetic antenna string having a first conductive element along the first direction, and the first conductive element is formed by a wire;

a transparent second sensing layer, having second capacitive sensing strings and second electromagnetic antenna strings, each second capacitive sensing string being composed of second capacitive sensing units connected in series along a second direction, an end of each second capacitive sensing string being provided with a second capacitive signal contact, each second electromagnetic antenna string being arranged along the second direction, an end of each second electromagnetic antenna string being provided with a second electromagnetic signal contact, another end thereof being connected to a second in-series wire, the second in-series wire connecting second electromagnetic antenna strings in series, each second sensing string and each second electromagnetic antenna string having a second conductive element along the second direction, and the second conductive element is formed by a wire; and a transparent insulative layer arranged between the first sensing layer and the second sensing layer to insulatively separate the two sensing layers;

wherein the first direction and the second direction are orthogonal, the first capacitive sensing strings interlace with the second sensing strings to make the first capacitive sensing units and the second capacitive sensing units be a complementary arrangement to form a capacitive sensing matrix with a grid shape, and the first electromagnetic antenna strings and the second electromagnetic antenna strings are orthogonally arranged to form an electromagnetic sensing matrix with a grid shape.

Each of the first and second sensing layers is a conductive film with transmittance and is made of metal oxide or graphene. The metal oxide is indium tin oxide (ITO), indium zinc oxide (IZO), aluminum zinc oxide (AZO) or antimony tin oxide (ATO).

Electrical resistivity of each of the first and second conductive elements is below $8 \times 10^{-8}$ $\Omega \cdot m$. Each of the first and second conductive wires is made of gold, silver, copper, aluminum, molybdenum, nickel or an alloy thereof. A width of each of the first and second wires is less than 25 μm, preferably less than 5 μm.

DETAILED DESCRIPTION OF THE INVENTION

Figure 1:
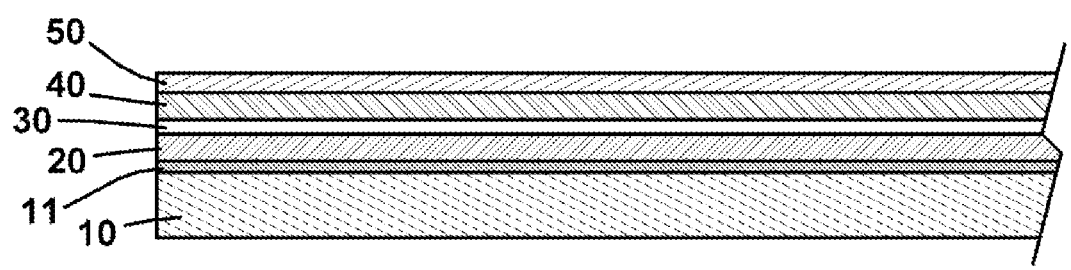
FIG. 1 is a schematic view of a laminated structure of the first embodiment of the touch sensor of the invention.
Figure 2:
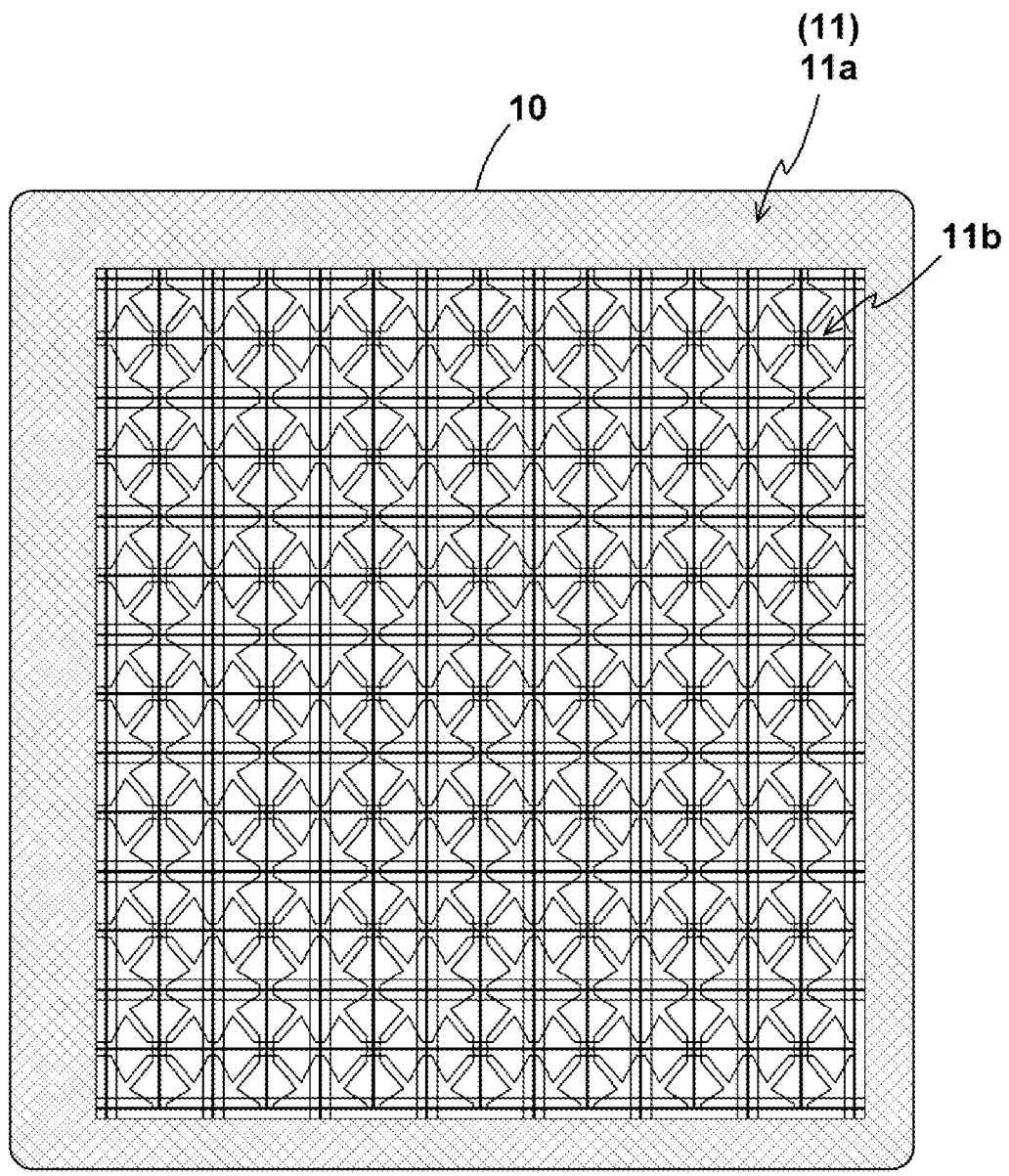
FIG. 2 is a top view of the first embodiment of the touch sensor of the invention.

To simplify the drawings and increase readability, the elements shown in the figures are not depicted with a precision scale, some elements are emphasized in scale and some irrelated details are omitted.

Please refer to FIGS. 1-5. The first embodiment of the composite transparent capacitive touch panel of the invention includes a base layer 10, a first sensing layer 20, an insulative layer 30, a second sensing layer 40 and a cover layer 50.

The base layer 10 is a glass thin plate with great mechanical strength and high transmittance. A periphery of the base layer 10 is provided with a colored bezel 11 formed by an insulative black matrix material. The colored bezel 11 defines a shaded area 11a on the base layer 10 and a visible area 11b within the shaded area 11a.

In this embodiment, the first sensing layer 20 is set to be an X-axis sensing layer. The first sensing layer 20 is disposed in the visible area 11b and includes multiple rows of first capacitive sensing strings 21 (i.e., X-axis capacitive sensing strings) and first electromagnetic sensing strings 26 (i.e., X-axis electromagnetic sensing strings). The first capacitive sensing strings 21 are parallelly spacedly interlaced with the first electromagnetic sensing strings 26. Each first capacitive sensing string 21 is composed of rhombic first capacitive sensing units 21a connected in series along a first direction (i.e., X-axis, hereinafter the same). An end of each first capacitive sensing string 21 is provided with a first capacitive signal contact 21b. Each first capacitive sensing string 21 has a first capacitive signal wire 23 along the first direction. Each first capacitive signal wire 23 electrically connects to one of the first capacitive signal contacts 21b and a string of the first capacitive sensing units 21a. Each first electromagnetic sensing string 26 is arranged along the first direction. An end of each first electromagnetic sensing string 26 is provided with a first electromagnetic signal contact 27. The other end thereof is connected to a first in-series wire 28. The first in-series wire 28 electrically connects the first electromagnetic antenna strings 26 in series. Each first electromagnetic antenna string 26 is provided with a first electromagnetic signal wire 29 along the first direction to electrically connect with one of the first electromagnetic signal contacts 27 and the first in-series wire 28.

The second sensing layer 40 is set to be a Y-axis sensing layer. The second sensing layer 40 is disposed in the visible area 11b and includes multiple rows of second capacitive sensing strings 41 (i.e., Y-axis capacitive sensing strings) and second electromagnetic antenna strings 46 (i.e., Y-axis electromagnetic sensing strings). The second capacitive sensing strings 41 are parallelly spacedly interlaced with the second electromagnetic antenna strings 46. Each second capacitive sensing string 41 is composed of rhombic second capacitive sensing units 41a connected in series along a second direction (i.e., Y-axis, hereinafter the same). An end of each second capacitive sensing string 41 is provided with a second capacitive signal contact 41b. Each second capacitive sensing string 41 has a second capacitive signal wire 43 along the second direction. Each second capacitive signal wire 43 electrically connects to one of the second capacitive signal contacts 41b and a string of the second capacitive sensing units 41a. Each second electromagnetic antenna string 46 is arranged along the second direction. An end of each second electromagnetic antenna string 46 is provided with a second electromagnetic signal contact 47. The other end thereof is connected to a second in-series wire 48. The second in-series wire 48 electrically connects the second electromagnetic antenna strings 46 in series. Each second electromagnetic antenna string 46 is provided with a second electromagnetic signal wire 49 along the second direction to electrically connect to one of the second electromagnetic signal contacts 47 and the second in-series wire 48.

Both the first and second capacitive signal contacts 21b, 41b and the first and second electromagnetic signal contacts 27, 47 are disposed within the shaded area 11a. They can send touch signals to a processor (not shown) through signal paths 25, 45.

The first and second sensing layers 20, 40 are made of transparent conductive films made of metal oxide such as indium tin oxide (ITO). The signal wires 23, 29, 43, 49 adopt a material with low resistance, whose electrical resistivity is below $8 \times 10^{-8}$ Ω·m, such as copper. Because the signal wires 23, 29, 43, 49 possess a lower impedance than those of the first and second sensing layers 20, 40, both connecting the capacitive signal wires 23, 43 to the first and second capacitive sensing strings 21, 41 and connecting the electromagnetic signal wires 29, 49 to the first and second electromagnetic antenna strings 26, 46 can enhance transmission effect of touch signals and effectively reduce an impedance between each first and second capacitive sensing string 21, 41 or each first and second electromagnetic antenna string 26, 46 and the signal contacts 21b, 41b, 27, 47 separately connected thereto to reduce attenuation in transmission of touch signals. It is noted that each of the capacitive wires 23, 43 is set to be below 5 μm in width. Such a nanoscale metal wire is still invisible by the naked eye even if it is made of an opaque material, so it is suitable to be used in the visible area 11 without reducing visibility of the transparent touch sensor.

The first and second sensing layers 20, 40 are insulatively separated by the transparent insulative layer 30 and the first and second capacitive sensing strings 21, 41 are orthogonally arranged to make the first and second capacitive units 21a, 41a correspondingly complementarily arranged to form a rhombic grid shaped capacitive sensing matrix. The first and second electromagnetic antenna strings 26, 46 are also orthogonally arranged to form a rhombic grid shaped electromagnetic antenna matrix. The transparent insulative layer 30 may be made of optical clear adhesive (OCA) or optical clear resin (OCR) to paste the two layers 20, 40.

Additionally, the cover layer 50 is adhered on the second sensing layer 40 for protection. The cover layer 50 is an insulative film with high transmittance, such as, but not limited to, polyethylene terephthalate (PET), Cyclo-olefin polymer (COP) or polyethylene (PE).

In sum, the invention utilizes a transparent conductive layer as a substrate to integrate both a capacitive touch sensor and an electromagnetic touch sensor to form a double-control transparent touch sensor structure which can be mounted on a display. The invention further utilizes connecting the signal wires 23, 29, 43, 49 to the first and second capacitive sensing strings 21, 41 and the first and second electromagnetic antenna strings 26, 46 to reduce impedance in the transmission paths of the touch signals. As a result, not only can the quality of signal transmission of touch signals be improved, but also it is advantageous to design of large-sized touch panels. Also, thickness of the conductive film of the touch sensing layer can be reduced so that the material cost can be saved and transmittance of the touch sensing layer can be enhanced. In addition, the nanoscale signal wires 23, 29, 43, 49 are substantially invisible and their occupation ratio to the whole area is below 0.3%. The light blocking rate is very low and almost all area of the touch sensing layer is light-permeable, so the transmittance is very great. Therefore, the tiny metal wires disposed in the sensing strings can effectively reduce impedance of the sensing strings and increase the efficiency of the signal transmission, but the visibility is not substantially affected.

Figure 3:
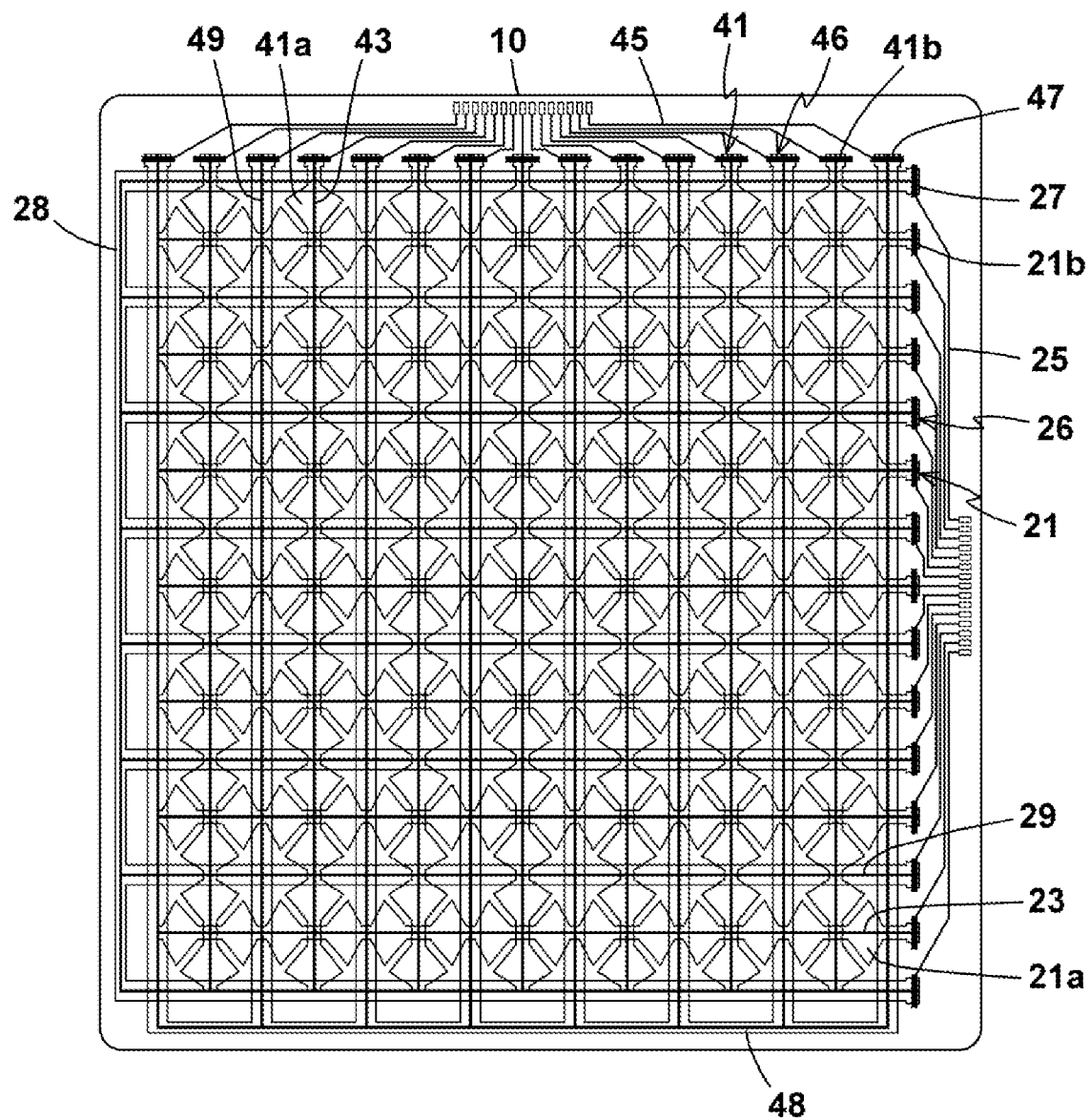
FIG. 3 is a bottom view of the first embodiment of the touch sensor of the invention.
Figure 4:
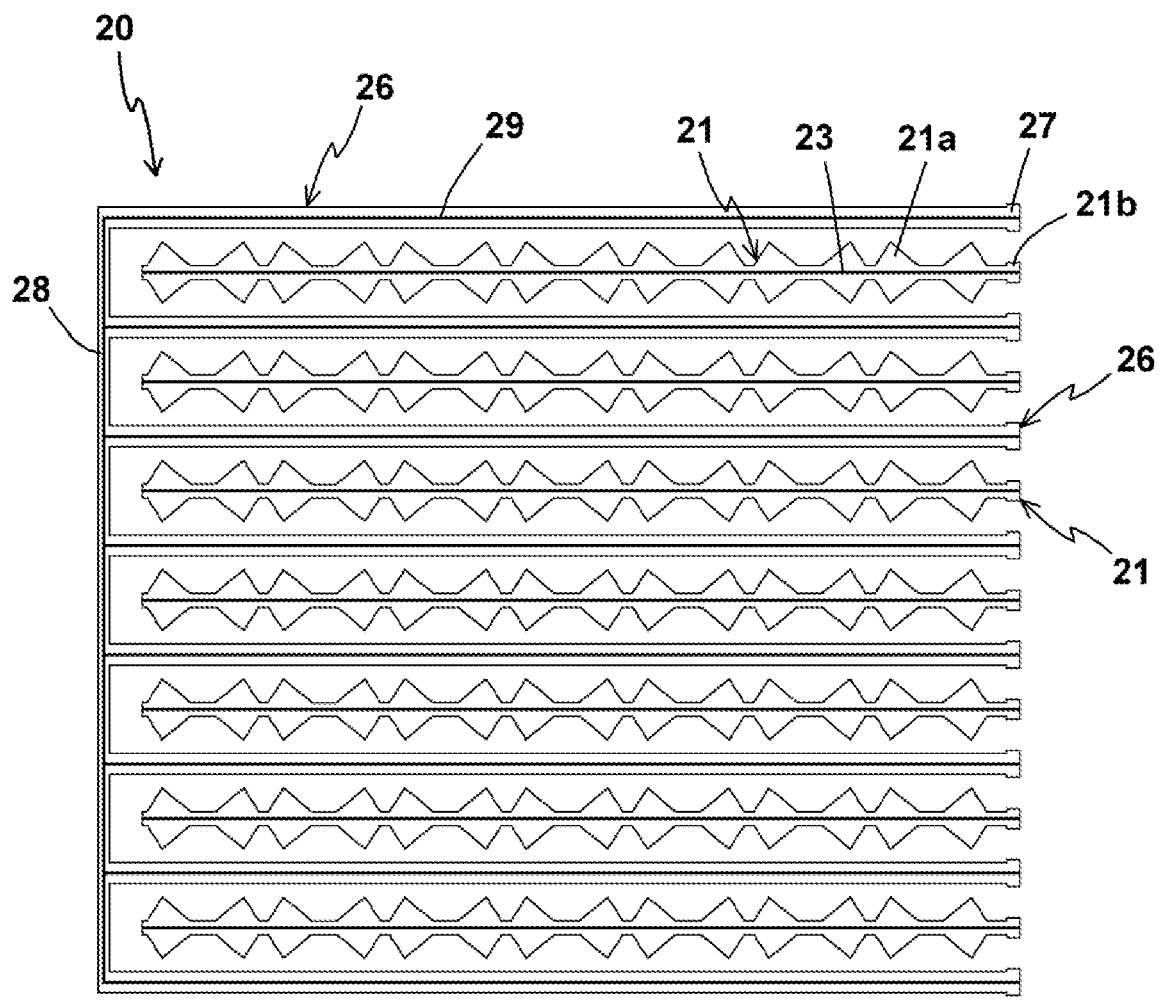
FIG. 4 is a plan view of the first sensing layer of the first embodiment of the touch sensor of the invention.
Figure 5:
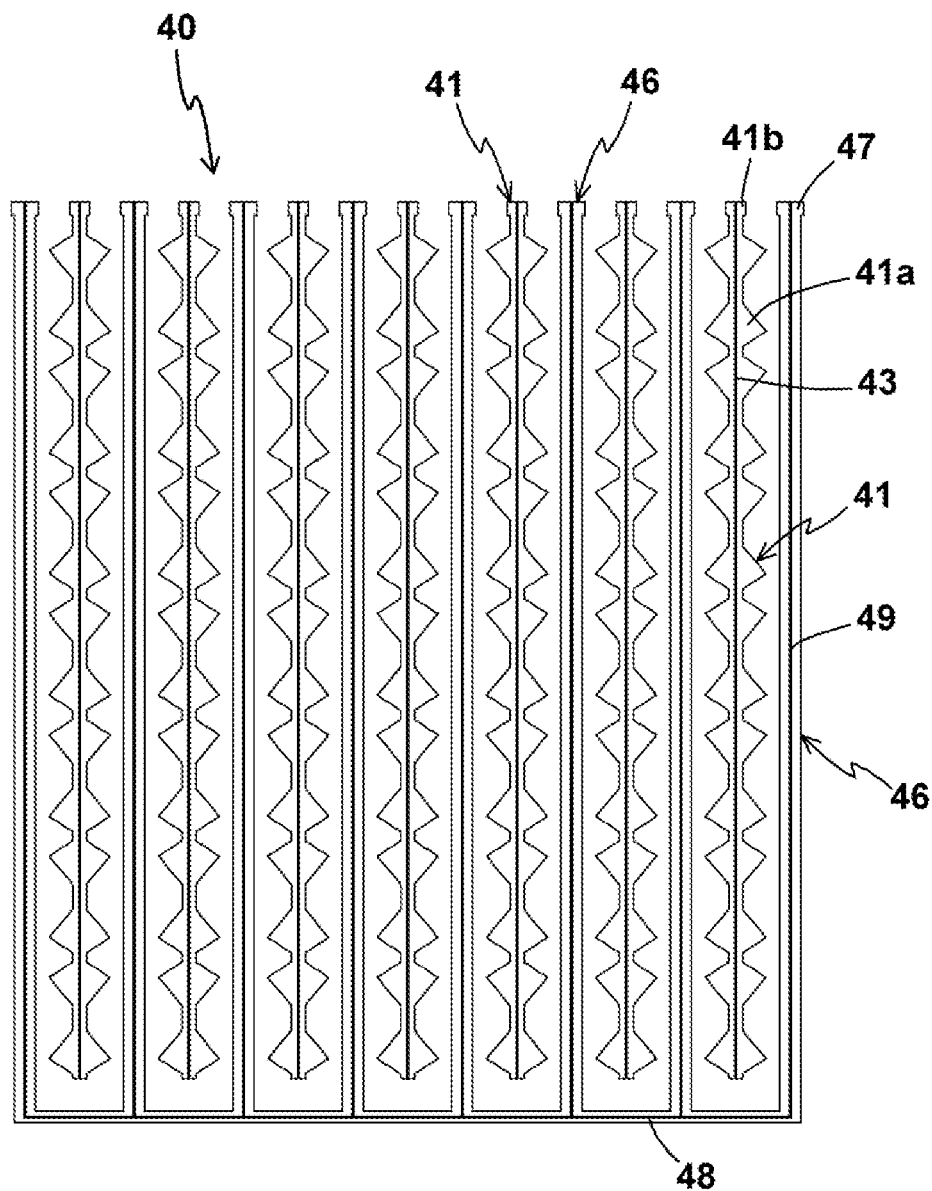
FIG. 5 is a plan view of the second sensing layer of the first embodiment of the touch sensor of the invention.
Figure 6:
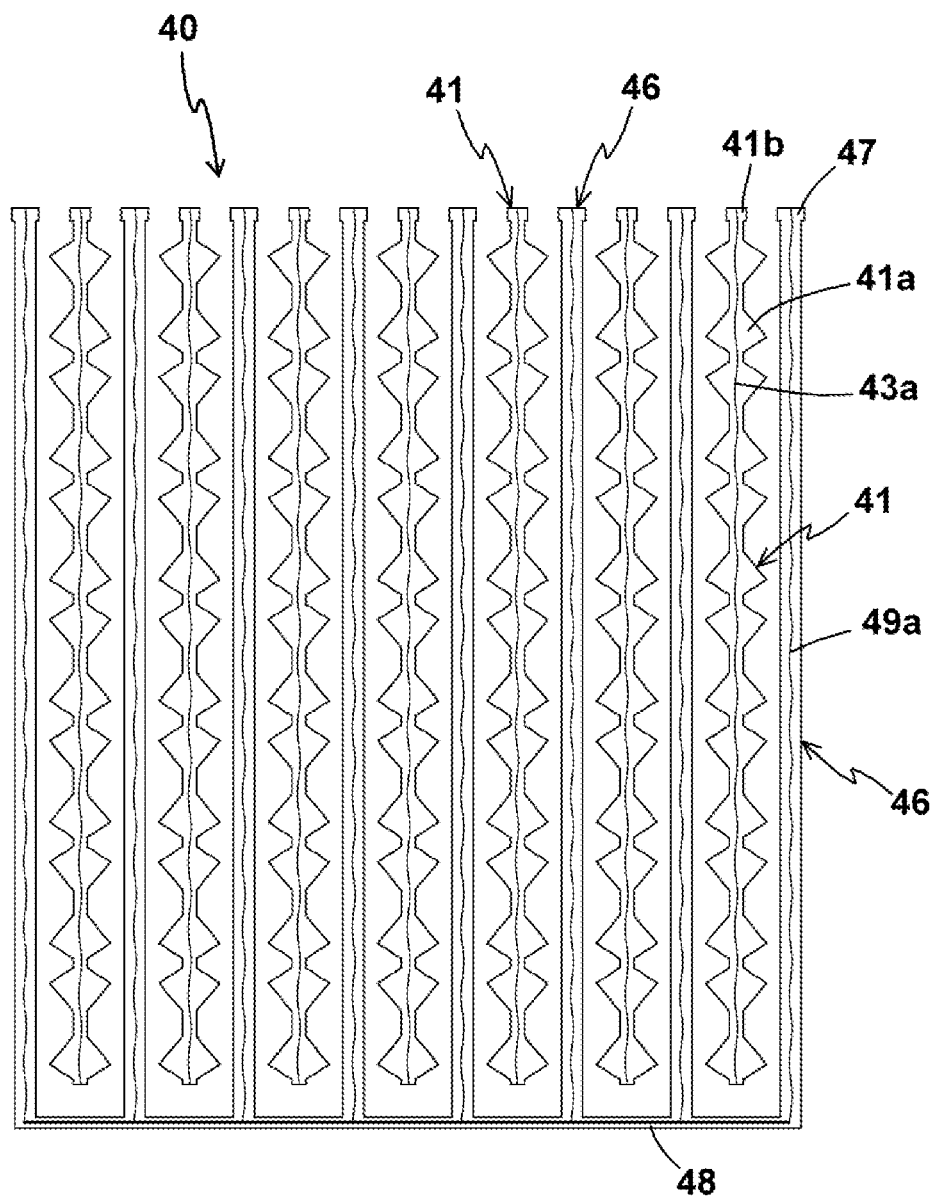
FIG. 6 is a plan view of the second sensing layer of the second embodiment of the touch sensor of the invention, which shows waved wires connected to the second capacitive sensing strings and the second electromagnetic antenna strings.
Figure 7:
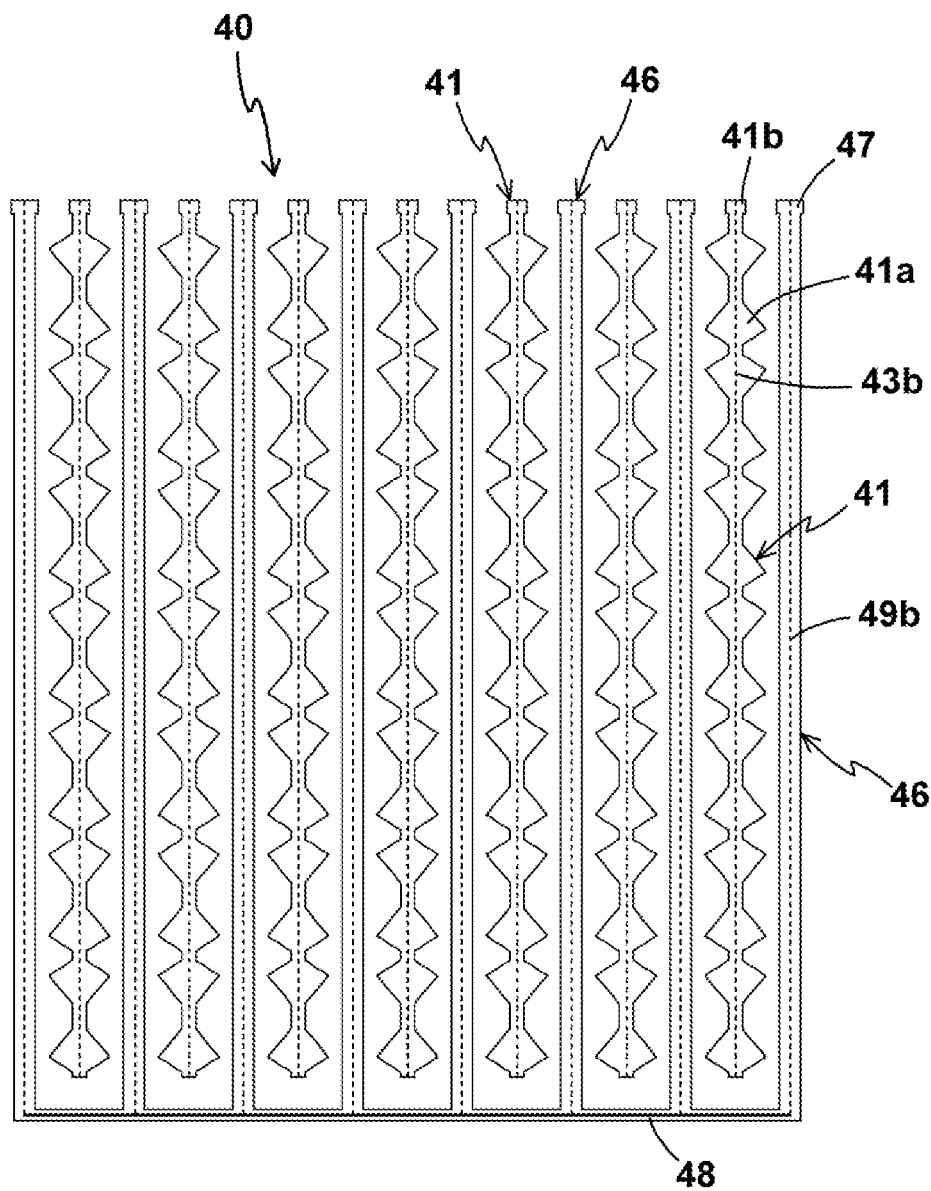
FIG. 7 is a plan view of the second sensing layer of the third embodiment of the touch sensor of the invention, which shows broken wires connected to the second capacitive sensing strings and the second electromagnetic antenna strings.
Figure 8:
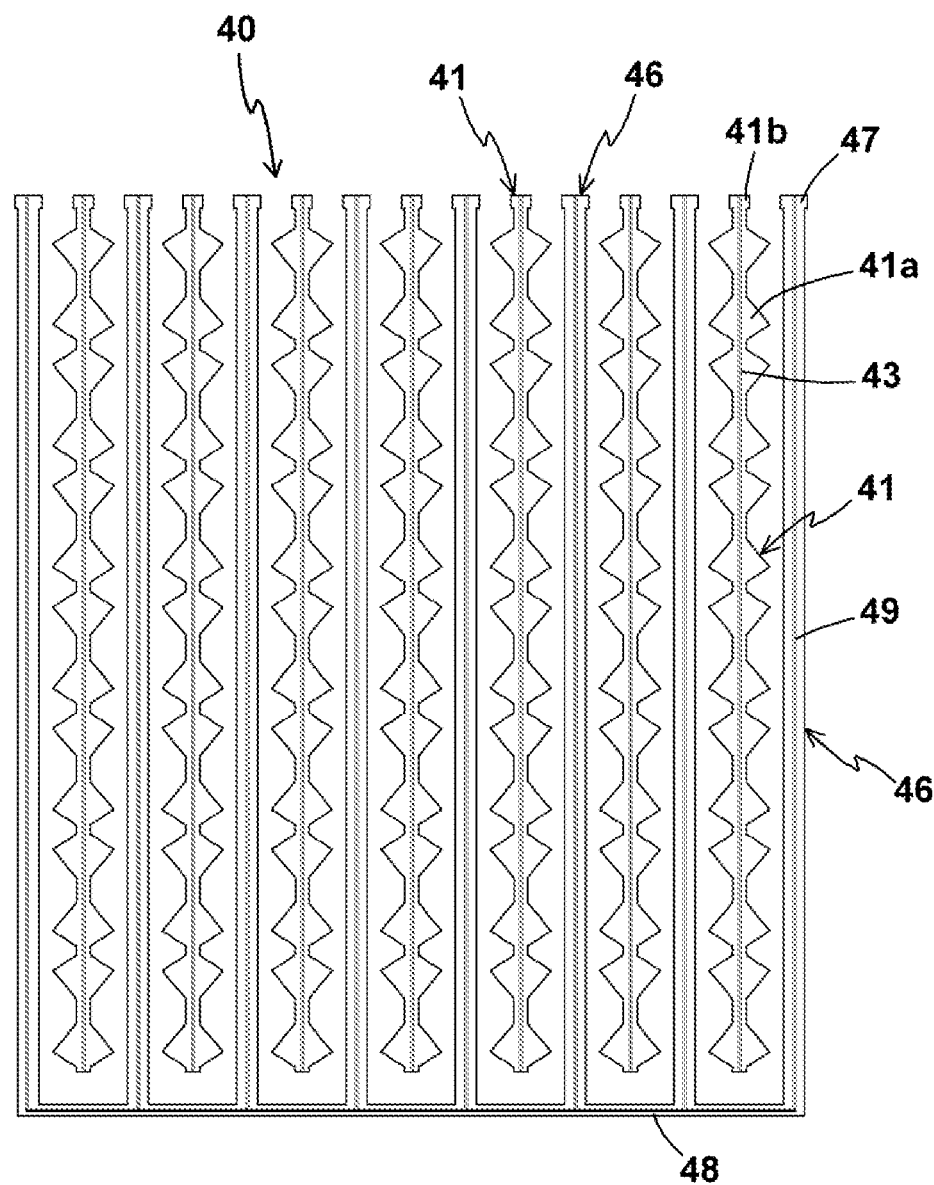
FIG. 8 is a plan view of the second sensing layer of the fourth embodiment of the touch sensor of the invention, which shows parallelly arranged wires connected to the second capacitive sensing strings and the second electromagnetic antenna strings.

In the second embodiment shown in FIG. 6, the capacitive signal wires 43a and the electromagnetic signal wire 49 are continuous waved lines. The signal wires 23, 29, 43, 49 in the first embodiment shown in FIG. 3 are straight lines, but the transparent touch panel is attached outside the display, such straight metal wires may cause a moire pattern to affect image quality. Therefore, the conductive wires may be of a waved shape or other regular or irregular shapes to reduce optical interference. In the third embodiment shown in FIG. 7, the second capacitive signal wires 43b and the second electromagnetic signal wire 49b are broken lines. As a result, impedance of such broken wires 43b, 49b can be flexibly adjusted depending on actual requirements. Such broken metal wires may also reduce optical interference and increase visibility. The fourth embodiment shown in FIG. 8 depicts each set of signal wires 43, 49 composed of a plurality of lines parallelly arranged. This can guarantee high efficiency of signal transmission.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A composite transparent capacitive touch sensor comprising:
a transparent first sensing layer, having first capacitive sensing strings and first electromagnetic antenna strings, each first capacitive sensing string being composed of first capacitive sensing units connected in series along a first direction, an end of each first capacitive sensing string being provided with a first capacitive signal contact, each first electromagnetic antenna string being arranged along the first direction, an end of each first electromagnetic antenna string being provided with a first electromagnetic signal contact, another end thereof being connected to a first in-series wire, the first in-series wire connecting first electromagnetic antenna strings in series, each first capacitive sensing string and each first electromagnetic antenna string having a first conductive element along the first direction, each of the first conductive elements is located in one of either of the first capacitive sensing strings and the first electromagnetic antenna strings, and the first conductive element is formed by a wire;
a transparent second sensing layer, having second capacitive sensing strings and second electromagnetic antenna strings, each second capacitive sensing string being composed of second capacitive sensing units connected in series along a second direction, an end of each second capacitive sensing string being provided with a second capacitive signal contact, each second electromagnetic antenna string being arranged along the second direction, an end of each second electromagnetic antenna string being provided with a second electromagnetic signal contact, another end thereof being connected to a second in-series wire, the second in-series wire connecting second electromagnetic antenna strings in series, each second capacitive sensing string and each second electromagnetic antenna string having a second conductive element along the second direction, each of the second conductive elements is located in one of either of the second capacitive sensing strings and the second electromagnetic antenna strings, and the second conductive element is formed by a wire; and
a transparent insulative layer arranged between the first sensing layer and the second sensing layer to insulatively separate the two sensing layers;
wherein each of the first and second conductive elements has a lower impedance than each of those of the first and second sensing layers, the first direction and the second direction are orthogonal, the first capacitive sensing strings interlace with the second sensing strings to make the first capacitive sensing units and the second capacitive sensing units be a complementary arrangement to form a capacitive sensing matrix with a grid shape, and the first electromagnetic antenna strings and the second electromagnetic antenna strings are orthogonally arranged to form an electromagnetic sensing matrix with a grid shape.

2. The composite transparent capacitive touch sensor of claim 1, wherein each of the first and second sensing layers is made of metal oxide or graphene.

3. The composite transparent capacitive touch sensor of claim 2, wherein the metal oxide is indium tin oxide, indium zinc oxide, aluminum zinc oxide or antimony tin oxide.

4. The composite transparent capacitive touch sensor of claim 1, wherein electrical resistivity of each of the first and second conductive elements is below $8 \times 10-8$ $\Omega \cdot m$.

5. The composite transparent capacitive touch sensor of claim 4, wherein each of the first and second conductive elements is made of gold, silver, copper, aluminum, molybdenum, nickel or an alloy thereof.

6. The composite transparent capacitive touch sensor of claim 1, wherein a width of each of the wires is less than 25 µm.

7. The composite transparent capacitive touch sensor of claim 6, wherein the width is less than 5 µm.

8. The composite transparent capacitive touch sensor of claim 1, wherein each of the first and second conductive elements is a continuously straight or waved line.

9. The composite transparent capacitive touch sensor of claim 1, wherein each of the first and second conductive elements is a broken line.

10. The composite transparent capacitive touch sensor of claim 1, wherein each of the first and second conductive elements is composed of two or more parallel lines.

11. The composite transparent capacitive touch sensor of claim 1, wherein the first capacitive sensing strings are parallelly spacedly interlaced with the first electromagnetic antenna strings, and the second capacitive sensing strings are parallelly spacedly interlaced with the second electromagnetic antenna strings.

12. The composite transparent capacitive touch sensor of claim 1, wherein the transparent insulative layer is made of optical clear adhesive (OCA) or optical clear resin (OCR).

13. The composite transparent capacitive touch sensor of claim 1, wherein the first direction is perpendicular to the second direction.

* * * * *